J. B. ROSE.
JACK.
APPLICATION FILED OCT. 31, 1917.
1,317,320.
Patented Sept. 30, 1919.
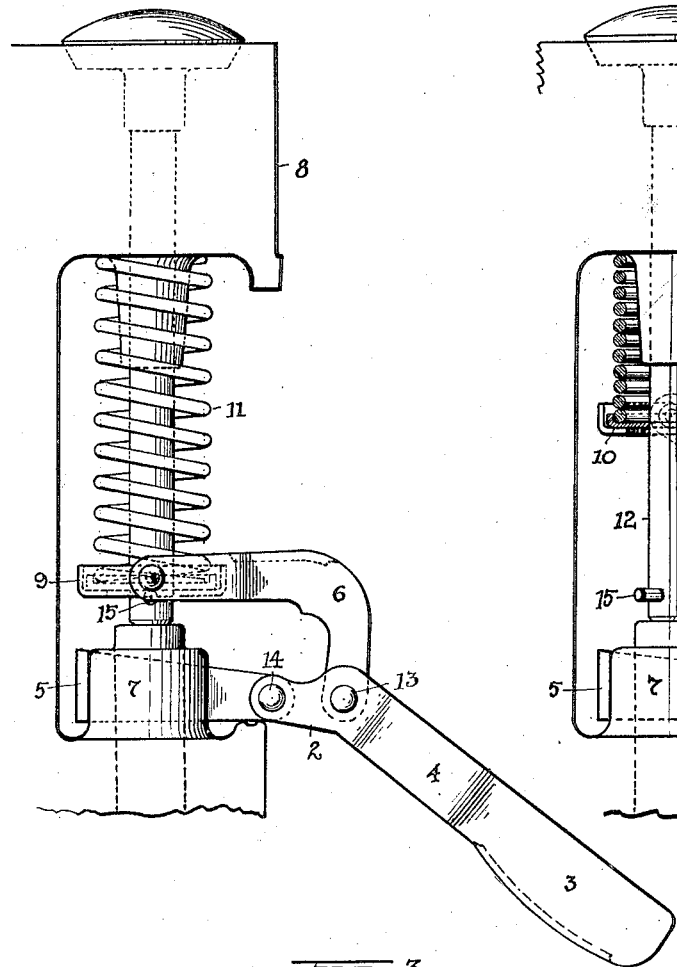
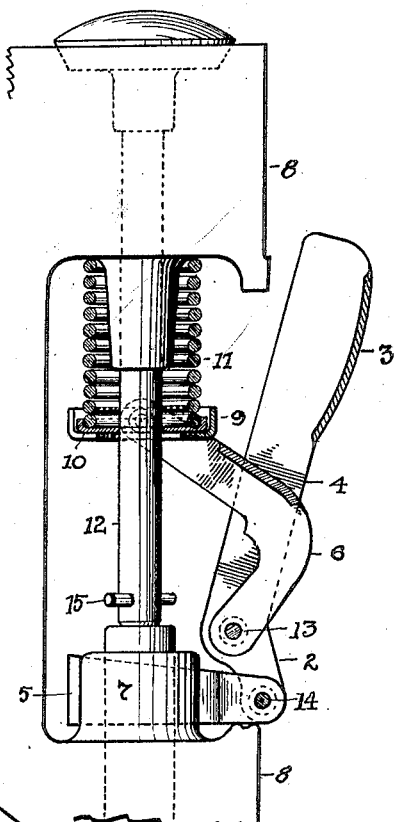
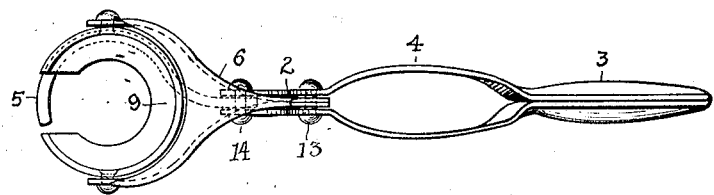
Inventor
J. B. ROSE.
Witness
Geo. E. Kricker.
By Fisher & Moser
Attorneys

UNITED STATES PATENT OFFICE.

JACOB B. ROSE, OF CLEVELAND, OHIO, ASSIGNOR TO THE MARVEL ACCESSORIES MANUFACTURING COMPANY, OF CLEVELAND, OHIO, A CORPORATION.

JACK.

1,317,320.  Specification of Letters Patent.  Patented Sept. 30, 1919.

Application filed October 31, 1917. Serial No. 199,395.

*To all whom it may concern:*

Be it known that I, JACOB B. ROSE, citizen of the United States, residing at Cleveland, in the county of Cuyahoga and State of Ohio, have invented certain new and useful Improvements in Jacks, of which the following is a specification.

This invention relates to jacks, and comprises a set of pivotally-united members adapted to be conveniently introduced beneath the spring parts of an engine valve and operated to relieve the tension on the valve stem so that the valve may be removed from its seat or rotated and ground in its seat.

In the accompanying drawings, Figure 1 is a side view of the jack as it appears when first applied beneath the spring in an engine valve. Fig. 2 is a view of the same parts, partly in section, with the jack in a locked raised position and the spring compressed. Fig. 3 is a plan view of the valve jack alone.

The valve jack shown comprises a lever 2 corresponding somewhat to a bell-crank and made of sheet-metal bent double to provide a rounded handle 3, a divided and bowed center portion 4, and a pair of parallel extremities between which a grab hook 5 and a forked lift arm 6 are separately pivoted. Hook 5 is adapted to grasp the boss or hub 7 of the engine frame 8 when the forked end of arm 6 and its pivoted cup-shaped yoke 9 are inserted beneath the seating washer 10 for the coiled spring 11 which encircles the valve stem 12 axially in line with boss 7. The simple movement of swinging lever 2 upward will force arm 6 in the same direction and compress the spring by raising the pivoted yoke 9 to the position approximately as shown in Fig. 2. In this raised position, the lever handle either bears against the engine frame, or the bowed center portion 4 of the lever engages the spreading sides of the forked end of arm 6, thus locking the folded parts in their raised position because the pressure of the spring now tends to throw the lever inward toward the engine frame instead of outward, the pivot pin 13 being situated at the left side of the main pivot 14 instead of at the right as at the beginning of the movement. As a result, the cotter or lock pin 15 extending through the lower end of the valve stem 12 is now accessible and also relieved of the pressure of the spring and may be easily removed to permit the valve to be rotated or removed.

If in the initial lift movement of the lever 3 there should be a tendency in the spring to resist such movement, the resistance can easily be overcome by giving the spring an upward start with one hand while the lever is being raised by the other hand.

What I claim is:

1. A valve jack, comprising a lever having a fulcrum extremity, and a bent arm pivoted in offset relation to said extremity to promote self-locking of the parts when turned upright, said arm having a forked extremity adapted to straddle a valve stem.

2. A valve jack, comprising a lever having a hook pivoted at one extremity thereof and a forked member pivoted adjacent said extremity, and a cup-shaped yoke pivotally secured between the forks of said member.

3. A valve jack, comprising a lever having a hook pivoted on the end thereof and a forked arm pivoted thereto adjacent the pivot of said hook.

4. A valve jack, comprising a lever having a hook engaged with its fulcrum end, a forked arm pivoted at its end to said lever between its ends, and a yoke member pivoted in said forked arm.

Signed at Cleveland, in the county of Cuyahoga, and State of Ohio, this 25th day of October, 1917.

JACOB B. ROSE.

Copies of this patent may be obtained for five cents each, by addressing the "Commissioner of Patents, Washington, D. C."